United States Patent [19]

Kutnyak

[11] 4,334,121
[45] Jun. 8, 1982

[54] ELECTRICAL CONDUIT INCLUDING HELICAL GROUNDING AND REINFORCING ELEMENTS

[75] Inventor: Thomas A. Kutnyak, Greenwood, S.C.

[73] Assignee: Automation Industries, Inc., Greenwich, Conn.

[21] Appl. No.: 150,212

[22] Filed: May 15, 1980

[51] Int. Cl.³ ............... H02G 3/04; F16L 11/10; F16L 11/12
[52] U.S. Cl. ..................... 174/68 C; 138/131; 138/139; 174/47; 174/65 R; 174/78
[58] Field of Search .......... 174/47, 65 R, 65 SS, 174/68 C, 78, 108, 109; 138/109, 122, 129, 131, 132, 133, 134, 139; 156/143, 144

[56] References Cited

U.S. PATENT DOCUMENTS 3,006,664 10/1961 Appleton et al. ............... 174/78 X
3,239,400 3/1966 Anselm ........................ 156/143 X
4,224,463 9/1980 Koerber et al. ............... 138/129 X Primary Examiner—Laramie E. Askin
Attorney, Agent, or Firm—Francis N. Carten

[57] ABSTRACT

An electrical conduit formed of helically fabricated grounding and reinforcing elements, including a spaced-turn foil channel defining a substantially smooth conduit bore, and an end fitting in combination with the conduit.

23 Claims, 4 Drawing Figures

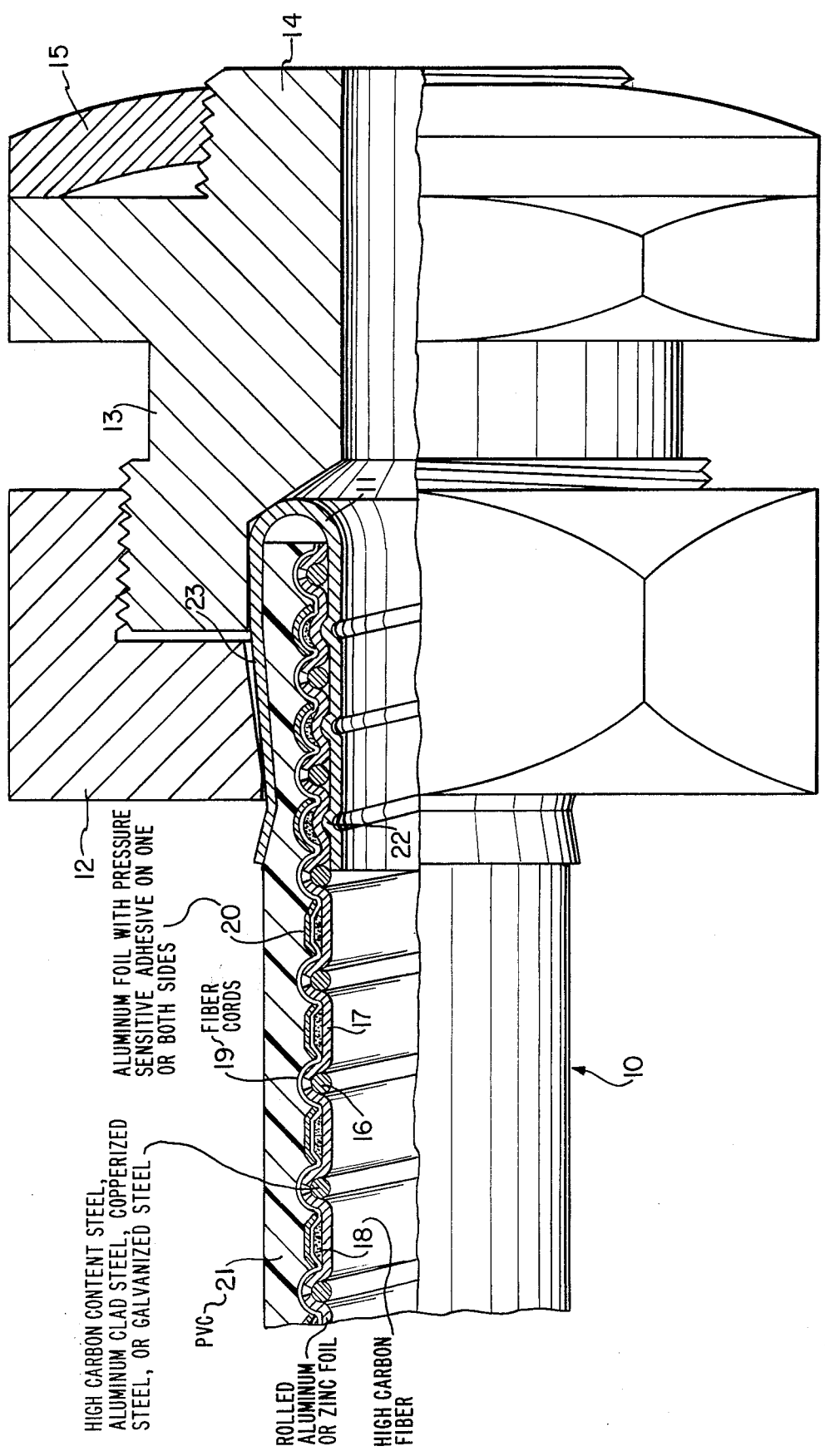

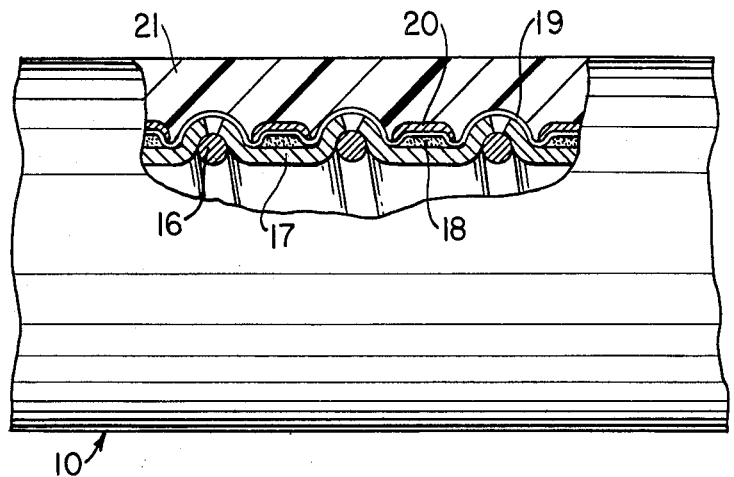
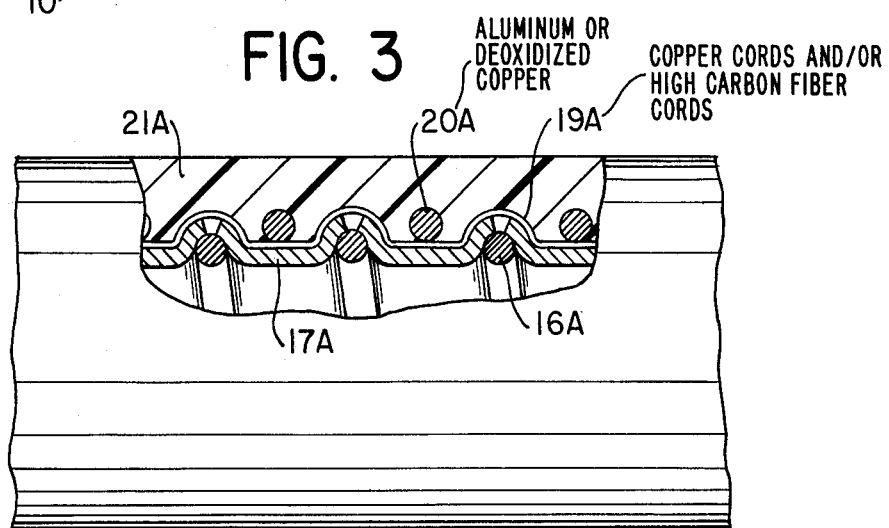
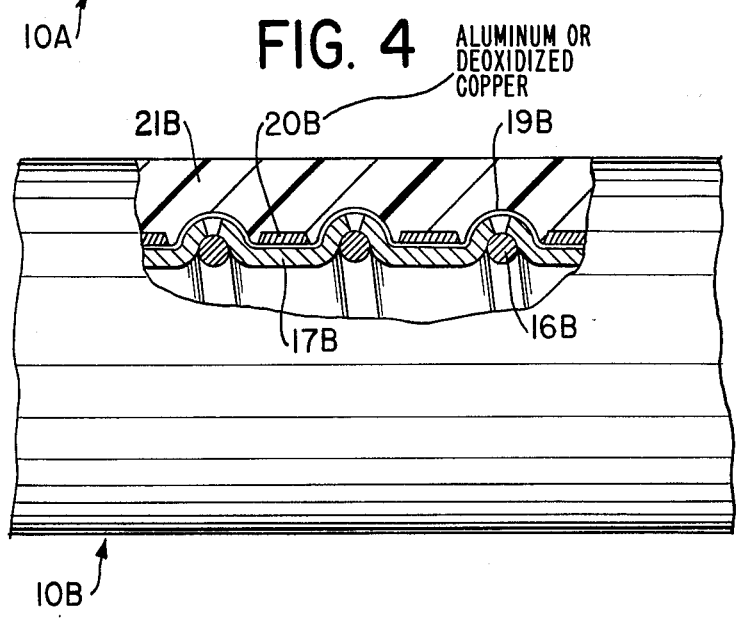

ELECTRICAL CONDUIT INCLUDING HELICAL GROUNDING AND REINFORCING ELEMENTS

BACKGROUND OF THE INVENTION

Electrical conduits of the general type contemplated by the invention are flexible armored electrically grounded housings for containing insulated conductors. They are connected by suitable end fittings to electrical inlet or outlet boxes and the conductors are drawn through the conduits in the course of installation. The most common form of conduit previously in use has been a roll-formed metal channel having interlocking turns, with a cotton cord between the turns for dampening noise and copper wire wrapped about the channel to provide an electrical ground. Such conduit designs of the prior art do not provide a smooth bore and difficulty is sometimes encountered in drawing the conductors through the conduit during installation. The construction is heavy, rather expensive and of limited flexibility. The gaps between the turns of the channel are not welded and electrical conductivity during grounding is not always reliable. Rather complex threaded end fitting designs are necessary to insure connection with the end portions of such conduits.

Other electrical conduit designs are known consisting of plastic flexible tubes reinforced with wire or a plastic helix, but those are for use only in light service applications.

It is the principal object of the present invention to provide a heavy duty electrical conduit of composite or matrix construction which is an improvement over the armored conduit designs of the prior art described above.

SUMMARY OF THE INVENTION

The invention provides an electrical conduit comprising a self-supporting helix and a foil channel applied helically about the helix and spanning the turns thereof. The edges of the channel are spaced apart over the turns of the helix. A plurality of cords may be applied substantially longitudinally about the channel. A helical extended element may be applied about the cords along the center of the channel to conform the cords to the channel configuration. An outer circumferentially complete jacket surrounds all of the foregoing elements.

In one form of the invention an electrically conductive grounding element is applied helically along the center of the channel inside the plurality of cords. In another form of the invention a helical extended element applied about the cords is itself a metal ground wire. In either case the invention further provides the combination of the above-described conduit with an end fitting comprising a cylindrical insert forcibly screwed into an end portion of the conduit. The insert has a helical exterior land of a pitch equal to that of the self-supporting helix, the helical land deforming the center of the channel outwardly.

The gap between the turns of the channel allows the assembly to flex readily through an ample bending range. At the same time the bore of the assembly is substantially smooth so that conductors may be easily drawn through during installation without snagging or abrading the insulation on the conductors. The relatively thin-walled channel is light in weight and low in cost and conforms readily to a screw connection with the threaded insert of the end fitting. Since the channel is reinforced by the interior helix, the composite conduit meets normal crush resistance requirements.

BRIEF DESCRIPTION OF THE DRAWINGS

FIG. 1 is a side view, half in section, of one form of the electrical conduit of the invention assembled with an end fitting;

FIG. 2 is an enlarged fragmentary side view partly in section showing the wall construction of the conduit in FIG. 1;

FIG. 3 is an enlarged fragmentary side view partly in section of another embodiment of the conduit of the invention; and FIG. 4 is a view similar to FIG. 3 of another embodiment of the conduit of the invention.

DESCRIPTION OF PREFERRED EMBODIMENT

Each of the forms of electrical conduit described herein is especially suited for fabrication on continuously advancing mandrels as described in U.S. Pat. No. 3,155,559. Such apparatus allows each of the helically disposed elements to be applied in turn together with the longitudinal cords and the outer jacket extruded in a continuous fashion so that the composite conduit emerges from the end of the mandrel in continuous lengths.

Referring first to FIG. 1 a conduit 10 made in accordance with the invention is attached at its end portion to a cylindrical metal insert 11, the form and function of which are described hereafter. A more detailed view of the particular construction of the conduit 10 is shown in FIG. 2 and alternate embodiments are illustrated in FIGS. 3 and 4, all of which are described more completely below. The insert 11 is held between a compression nut 12 and a reducing adaptor 13 which are threaded together. On a threaded end 14 of the adaptor 13 a locking nut is screwed in place to hold the entire end fitting to the wall of an electrical inlet or outlet box (not shown).

In both FIGS. 1 and 2 the form of conduit includes first a self-supporting round wire helix 16 of steel with a high carbon content, aluminum clad steel, copperized steel or galvanized steel. A high carbon content provides good electrical properties. The turns of the helix 16 are spaced apart many times the wire diameter.

Wrapped helically about the helix 16 is a preformed rolled aluminum or zinc foil channel 17 approximately 0.006 inch having upstanding lips which conform to the shape of the wire helix 16, but with a gap of perhaps 0.040 inch between the channel turns over the wire to allow the channel to bend easily without displacement of its neutral bending axis (i.e. that axis which does not change length in a bend) from its geometric centerline. Together the turns of the wire helix 16 and channel 17 define the bore of the conduit, and it is particularly smooth and free of ridges which otherwise could cause snagging or abrasion of an electrical conductor pulled through it.

In the form of conduit shown in FIGS. 1 and 2 an electrically conductive high carbon fiber grounding strip 18 is applied helically along the center of the channel 17. A 90% pure carbon fiber is especially satisfactory for providing a continuous ground between the channel and the outer elements of the conduit.

A plurality of circumferentially equally spaced fiber cords 19 are applied longitudinally about the channel 17 and grounding strip 18. They may range from eight to eighteen in number spaced from 20° to 40° apart. A high tensile modulus is desirable in these cords because they provide the necessary tensile strength in the conduit.

Applied about the cords 19 is a helical extended element 20 which overlies the center of the channel 17 and the grounding strip 18. The principal function of the extended element is to conform the cords 19 to the channel configuration, though it also serves to enclose the carbon grounding strip 18 so that no loose carbon particles escape. The extended element may advantageously be aluminum foil tape 0.002 to 0.004 inch thick with pressure sensitive adhesive on one or both of its sides.

A polyvinyl chloride jacket 21 is extruded about all of the foregoing elements to seal the assembly from water penetration. It may be from 0.035 to 0.065 inch thick and to meet code requirements it is fire retardant.

Referring again to FIG. 1 the insert 11 of the end fitting is formed with a helical exterior land 22 of a pitch equal to that of the wire helix 16. The diameter of the insert 11 is such that it can be forcibly screwed into the end portion of the conduit 10 so that the helical land 22 deforms the center of the channel 17 outwardly. The insert further includes a turned back sleeve portion 23 which surrounds the exterior of the jacket 21 end portion in sealing engagement therewith.

Turning now to the embodiment of FIG. 3, this form of conduit includes a wire helix 16A and channel 17A similar to those of the FIG. 2 embodiment. However cords 19A are either of high carbon fiber such as that described for the grounding strip 18, or copper wire of about 0.015 inch diameter. In still another form the cords 19A may be alternately high carbon fiber and copper wire. In the place of both the grounding strip 18 and the extended element 20, the embodiment of FIG. 3 includes a single strand 20A in the form of deoxidized pure copper or aluminum wire of electrical grade. A jacket 21A surrounds all of the elements as in the previous embodiment.

In the third form of the invention shown in FIG. 4 a helix 16B, a channel 17B, an arrangement of longitudinal cords 19B and an outer jacket 21B are similar to the corresponding elements of the FIG. 3 embodiment. However, an extended element 20B is a strip or flat wire rather than a round wire of deoxidized pure copper or aluminum of electrical grade. The strip may be from 0.025 to 0.040 inch thick and from 0.125 to 0.175 inch wide.

The advantages of the present invention, as well as certain changes and modifications to the disclosed embodiments thereof, will be readily apparent to those skilled in the art. It is the applicant's intention to cover all those changes and modifications which could be made to the embodiments of the invention herein chosen for the purposes of the disclosure without departing from the spirit and scope of the invention.

I claim:
1. An electrical conduit comprising:
   (a) a self-supporting helix;
   (b) a foil channel applied helically about the helix and spanning the turns thereof, the edges of the channel being spaced apart over the turns of the helix;
   (c) a plurality of cords applied substantially longitudinally about the channel;
   (d) a helical extended element applied about the cords along the center of the channel to conform the cords to the channel configuration; and
   (e) an outer circumferentially complete jacket.

2. An electrical conduit according to claim 1 wherein an electrically conductive grounding element is applied helically along the center of the channel inside the plurality of cords.

3. An electrical conduit according the claim 2 wherein the grounding element is of high carbon fiber.

4. An electrical conduit according to claim 3 wherein the grounding element is of strip form.

5. An electrical conduit according to claim 4 wherein the helical extended element applied about the cords is a metal foil tape.

6. An electrical conduit according to claim 5 wherein the metal foil tape has pressure sensitive adhesive on at least one side thereof.

7. An electrical conduit according to claim 1 wherein the helical extended element applied about the cords is a metal ground wire.

8. An electrical conduit according to claim 7 wherein the helical extended element is a round wire.

9. An electrical conduit according to claim 7 wherein the helical extended element is a flat wire.

10. An electrical conduit according to claim 7 wherein the longitudinal cords are alternately of fiber and metal.

11. An electrical conduit comprising
   (a) a self-supporting metal round wire helix having spaced turns;
   (b) a pre-formed metal foil channel applied helically about the wire helix and spanning the turns thereof to define a substantially smooth interior conduit surface, the edges of the channel being spaced apart over the turns of the wire helix;
   (c) a plurality of circumferentially equally spaced cords applied longitudinally about the channel;
   (d) a helical extended element applied about the cords along the center of the channel to conform the cords to the channel configuration; and
   (e) an outer circumferentially complete extruded plastic jacket.

12. An electrical conduit according to claim 11 wherein an electrically conductive high carbon fiber grounding strip is applied helically along the center of the channel inside the plurality of cords, and the helical extended element applied about the cords is a metal foil tape with pressure sensitive adhesive on at least one side thereof.

13. An electrical conduit according to claim 12 wherein the channel is of aluminum, the longitudinal cords are of fiber and the outer jacket is of polyvinyl chloride.

14. An electrical conduit according to claim 11 wherein the helical extended element applied about the cords is a metal ground wire.

15. An electrical conduit according to claim 14 wherein the channel is of aluminum, the longitudinal cords are alternately of fiber and metal, and the outer jacket is of polyvinyl chloride.

16. An electrical conduit comprising
   (a) a self-supporting helix;
   (b) a foil channel applied helically about the helix and spanning the turns thereof, the edges of the channel being spaced apart over the turns of the helix;
   (c) an electrically conductive grounding element applied helically about the channel; and
   (d) an outer circumferentially complete jacket.

17. An electrical conduit according to claim 16 wherein the grounding element is of high carbon fiber.

18. An electrical conduit according to claim 17 wherein the grounding element is of strip form.

19. An electrical conduit and end fitting assembly comprising
(a) an electrical conduit comprising
  i. a self-supporting helix;
  ii. a foil channel applied helically about the helix and spanning the turns thereof, the edges of the channel being spaced apart over the turns of the helix;
  iii. an electrically conductive grounding element applied helically about the channel; and
  iv. an outer circumferentially complete jacket; and
(b) an end fitting comprising
  i. a cylindrical insert forcibly screwed into an end portion of the conduit;
  ii. the insert having a helical exterior land of a pitch equal to that of the self-supporting helix;
  iii. the helical land deforming the center of the channel outwardly.

20. An electrical conduit and end fitting assembly comprising
(a) an electrical conduit comprising
  i. a self-supporting helix;
  ii. a foil channel applied helically about the helix and spanning the turns thereof, the edges of the channel being spaced apart over the turns of the helix;
  iii. a plurality of cords applied substantially longitudinally about the channel;
  iv. a helical extended element applied about the cords along the center of the channel to conform the cords to the channel configuration; and
  v. an outer circumferentially complete jacket; and
(b) an end fitting comprising
  i. a cylindrical insert forcibly screwed into an end portion of the conduit;
  ii. the insert having a helical exterior land of a pitch equal to that of the self-supporting helix;
  iii. the helical land deforming the center of the channel outwardly.

21. An electrical conduit and end fitting assembly according to claim 20 wherein the insert includes a turned back sleeve portion surrounding an exterior portion of the jacket in sealing engagement therewith.

22. An electrical conduit and end fitting assembly comprising
(a) an electrical conduit comprising
  i. a self-supporting metal round wire helix having spaced turns;
  ii. a pre-formed metal foil channel applied helically about the wire helix and spanning the turns thereof to define a substantially smooth interior conduit surface, the edges of the channel being spaced apart over the turns of the wire helix;
  iii. a plurality of circumferentially equally spaced cords applied longitudinally about the channel;
  iv. a helical extended element applied about the cords along the center of the channel to conform the cords to the channel configuration; and
  v. an outer circumferentially complete extruded plastic jacket; and
(b) an end fitting comprising
  i. a cylindrical metal insert forcibly screwed into an end portion of the conduit;
  ii. the insert having a helical exterior land of a pitch equal to that of the self-supporting wire helix;
  iii. the helical land deforming the center of the channel outwardly.

23. An electrical conduit and end fitting assembly according to claim 22 wherein the insert includes an integral turned back sleeve portion surrounding an exterior end portion of the jacket in sealing engagement therewith.

* * * * *